(12) United States Patent
Kasad et al.

(10) Patent No.: US 9,204,294 B2
(45) Date of Patent: *Dec. 1, 2015

(54) LOCATION PRIVACY SELECTOR

(71) Applicant: TeleCommunication Systems, Inc., Annapolis, MD (US)

(72) Inventors: Farhad Kasad, Bothell, WA (US); Camron Lockeby, Puyallup, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 307 days.

This patent is subject to a terminal disclaimer.

(21) Appl. No.: 13/679,235

(22) Filed: Nov. 16, 2012

(65) Prior Publication Data

US 2013/0130654 A1     May 23, 2013

Related U.S. Application Data

(63) Continuation of application No. 13/067,942, filed on Jul. 8, 2011, now Pat. No. 8,315,599.

(60) Provisional application No. 61/344,383, filed on Jul. 9, 2010.

(51) Int. Cl.
| | |
|---|---|
| *H04M 3/16* | (2006.01) |
| *H04W 12/02* | (2009.01) |
| *H04L 29/06* | (2006.01) |
| *H04W 12/08* | (2009.01) |
| *H04W 88/02* | (2009.01) |

(52) U.S. Cl.
CPC ............. *H04W 12/02* (2013.01); *H04L 63/107* (2013.01); *H04W 12/08* (2013.01); *H04W 88/02* (2013.01)

(58) Field of Classification Search
CPC ........................ H04M 2203/557; H04L 67/306
USPC .......... 455/411, 412.2, 567, 41.2, 456.1, 574, 455/456.3, 418, 457, 550.1, 556.2; 348/14.02; 715/773, 847, 769; 707/710, 14.16
See application file for complete search history.

(56) References Cited

U.S. PATENT DOCUMENTS

| | | | |
|---|---|---|---|
| 4,445,118 | A | 4/1984 | Taylor |
| 4,928,107 | A | 5/1990 | Kuroda |
| 4,972,484 | A | 11/1990 | Theile |
| 5,126,722 | A | 6/1992 | Kamis |
| 5,283,570 | A | 2/1994 | DeLuca |
| 5,301,354 | A | 4/1994 | Schwendeman |
| 5,311,516 | A | 5/1994 | Kuznicki |
| 5,327,529 | A | 7/1994 | Fults |
| 5,335,246 | A | 8/1994 | Yokev |
| 5,351,235 | A | 9/1994 | Lahtinen |
| 5,365,451 | A | 11/1994 | Wang |

(Continued)

OTHER PUBLICATIONS

Internal Search Report received in PCT/US2009/05575 dated Jan. 14, 2011.

(Continued)

*Primary Examiner* — Kiet Doan
(74) *Attorney, Agent, or Firm* — William H. Bollman

(57) ABSTRACT

A wireless device capable of being located over a network by a requesting party comprises a phone, and a display to display a visually-continuous location privacy slider having at least five stops. Each of the at least five stops corresponds to a given combination of settings within the phone relating to a privacy of reporting of location of the wireless device to a requesting device.

13 Claims, 12 Drawing Sheets

(56) References Cited

U.S. PATENT DOCUMENTS

| | | |
|---|---|---|
| 5,418,537 A | 5/1995 | Bird |
| 5,422,813 A | 6/1995 | Schuchman |
| 5,479,408 A | 12/1995 | Will |
| 5,485,163 A | 1/1996 | Singer et al. |
| 5,504,491 A | 4/1996 | Chapman |
| 5,506,886 A | 4/1996 | Maine |
| 5,517,199 A | 5/1996 | DiMattei |
| 5,530,655 A | 6/1996 | Lokhoff |
| 5,530,914 A | 6/1996 | McPheters |
| 5,539,395 A | 7/1996 | Buss |
| 5,539,829 A | 7/1996 | Lokhoff |
| 5,546,445 A | 8/1996 | Dennison |
| 5,568,153 A | 10/1996 | Beliveau |
| 5,583,774 A | 12/1996 | Diesel |
| 5,594,780 A | 1/1997 | Weideman |
| 5,606,618 A | 2/1997 | Lokhoff |
| 5,629,693 A | 5/1997 | Janky |
| 5,633,630 A | 5/1997 | Park |
| 5,636,276 A | 6/1997 | Brugger |
| 5,661,652 A | 8/1997 | Sprague |
| 5,661,755 A | 8/1997 | Van de Kerkhof |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo et al. |
| 5,731,785 A | 3/1998 | Lemelson |
| 5,765,152 A | 6/1998 | Erickson |
| 5,771,353 A | 6/1998 | Eggleston |
| 5,774,670 A | 6/1998 | Montulli |
| 5,809,415 A | 9/1998 | Rossman |
| 5,812,086 A | 9/1998 | Bertiger |
| 5,812,087 A | 9/1998 | Krasner |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,922,074 A | 7/1999 | Richard |
| 5,930,250 A | 7/1999 | Klok |
| 5,945,944 A | 8/1999 | Krasner |
| 5,946,629 A | 8/1999 | Sawyer |
| 5,950,137 A | 9/1999 | Kim |
| 5,960,362 A | 9/1999 | Grob |
| 5,983,099 A | 11/1999 | Yao |
| 5,999,124 A | 12/1999 | Sheynblat |
| 6,032,051 A | 2/2000 | Hall |
| 6,052,081 A | 4/2000 | Krasner |
| 6,058,338 A | 5/2000 | Agashe et al. |
| 6,061,018 A | 5/2000 | Sheynblat |
| 6,064,336 A | 5/2000 | Krasner |
| 6,067,045 A | 5/2000 | Castelloe |
| 6,081,229 A | 6/2000 | Soliman |
| 6,085,320 A | 7/2000 | Kaliski, Jr. |
| 6,118,403 A | 9/2000 | Lang |
| 6,121,923 A | 9/2000 | King |
| 6,124,810 A | 9/2000 | Segal |
| 6,131,067 A | 10/2000 | Girerd |
| 6,133,874 A | 10/2000 | Krasner |
| 6,134,483 A | 10/2000 | Vayanos |
| 6,147,598 A | 11/2000 | Murphy |
| 6,150,980 A | 11/2000 | Krasner |
| 6,154,172 A | 11/2000 | Piccionelli |
| 6,169,901 B1 | 1/2001 | Boucher |
| 6,169,902 B1 | 1/2001 | Kawamoto |
| 6,178,506 B1 | 1/2001 | Quick, Jr. |
| 6,185,427 B1 | 2/2001 | Krasner |
| 6,188,354 B1 | 2/2001 | Soliman |
| 6,188,909 B1 | 2/2001 | Alanara |
| 6,189,098 B1 | 2/2001 | Kaliski, Jr. |
| 6,195,557 B1 | 2/2001 | Havinis |
| 6,204,798 B1 | 3/2001 | Fleming |
| 6,205,330 B1 | 3/2001 | Winbladh |
| 6,208,290 B1 | 3/2001 | Krasner |
| 6,215,441 B1 | 4/2001 | Moeglein |
| 6,239,742 B1 | 5/2001 | Krasner |
| 6,247,135 B1 | 6/2001 | Feague |
| 6,249,873 B1 | 6/2001 | Richard |
| 6,253,203 B1 | 6/2001 | O'Flaherty |
| 6,260,147 B1 | 7/2001 | Quick, Jr. |
| 6,275,692 B1 | 8/2001 | Skog |
| 6,275,849 B1 | 8/2001 | Ludwig |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,321,257 B1 | 11/2001 | Kotala |
| 6,324,542 B1 | 11/2001 | Wright, Jr. et al. |
| 6,327,473 B1 | 12/2001 | Soliman |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,430,504 B1 | 8/2002 | Gilbert |
| 6,433,734 B1 | 8/2002 | Krasner |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,525,687 B2 | 2/2003 | Roy |
| 6,525,688 B2 | 2/2003 | Chou |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | Fomukong |
| 6,560,534 B2 | 5/2003 | Abraham |
| 6,567,035 B1 | 5/2003 | Elliott |
| 6,570,530 B2 | 5/2003 | Gaal |
| 6,574,558 B2 | 6/2003 | Kohli |
| 6,580,390 B1 | 6/2003 | Hay |
| 6,584,552 B1 | 6/2003 | Kuno et al. |
| 6,594,500 B2 | 7/2003 | Bender |
| 6,597,311 B2 | 7/2003 | Sheynblat |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockheart |
| 6,628,233 B2 | 9/2003 | Knockheart |
| 6,633,255 B2 | 10/2003 | Krasner |
| 6,640,184 B1 | 10/2003 | Rabe |
| 6,650,288 B1 | 11/2003 | Pitt et al. |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynbalt |
| 6,680,694 B1 | 1/2004 | Knockheart |
| 6,680,695 B2 | 1/2004 | Turetzky |

(56) References Cited

U.S. PATENT DOCUMENTS

| | | |
|---|---|---|
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | van Diggelen |
| 6,704,651 B2 | 3/2004 | Van Diggelen |
| 6,707,421 B1 | 3/2004 | Drury |
| 6,714,793 B1 | 3/2004 | Carey |
| 6,721,871 B2 | 4/2004 | Piispanen |
| 6,724,342 B2 | 4/2004 | Bloebaum |
| 6,725,159 B2 | 4/2004 | Krasner |
| 6,731,940 B1 | 5/2004 | Nagendran |
| 6,734,821 B2 | 5/2004 | van Diggelen |
| 6,738,013 B2 | 5/2004 | Orler |
| 6,738,800 B1 | 5/2004 | Aguilon |
| 6,741,842 B2 | 5/2004 | Goldberg |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,772,340 B1 | 8/2004 | Peinado |
| 6,775,655 B1 | 8/2004 | Peinado et al. |
| 6,775,802 B2 | 8/2004 | Gaal |
| 6,778,136 B2 | 8/2004 | Gronomeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,050 B1 | 9/2004 | Krasner |
| 6,801,124 B2 | 10/2004 | Naitou |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen et al. |
| 6,816,734 B2 | 11/2004 | Wong et al. |
| 6,820,069 B1 | 11/2004 | Kogan et al. |
| 6,829,475 B1 | 12/2004 | Lee |
| 6,832,373 B2 | 12/2004 | O'Neill |
| 6,833,785 B2 | 12/2004 | Brown |
| 6,839,020 B2 | 1/2005 | Geier |
| 6,839,021 B2 | 1/2005 | Sheynblat |
| 6,842,715 B1 | 1/2005 | Gaal |
| 6,853,849 B1 | 2/2005 | Tognazzini |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,734 B2 | 3/2005 | Voor |
| 6,873,854 B2 | 3/2005 | Crockett |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,324 B2 | 5/2005 | Straub |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,956,467 B1 | 10/2005 | Mercado, Jr. |
| 6,957,073 B2 | 10/2005 | Bye |
| 6,961,562 B2 | 11/2005 | Ross |
| 6,965,754 B2 | 11/2005 | King |
| 6,965,767 B2 | 11/2005 | Maggenti |
| 6,970,917 B1 | 11/2005 | Kushwaha |
| 6,973,166 B1 | 12/2005 | Tsumpes |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,105 B1 | 1/2006 | Pitt et al. |
| 6,996,720 B1 | 2/2006 | DeMello |
| 6,999,782 B2 | 2/2006 | Shaughnessy |
| 7,024,321 B1 | 4/2006 | Deniger |
| 7,024,393 B1 | 4/2006 | Peinado |
| 7,047,411 B1 | 5/2006 | DeMello |
| 7,058,358 B2 | 6/2006 | Cannon |
| 7,064,656 B2 | 6/2006 | Bekcher |
| 7,065,351 B2 | 6/2006 | Carter |
| 7,065,507 B2 | 6/2006 | Mohammed |
| 7,071,814 B1 | 7/2006 | Schorman |
| 7,079,857 B2 | 7/2006 | Maggenti et al. |
| 7,103,018 B1 | 9/2006 | Hasen |
| 7,103,574 B1 | 9/2006 | Peinado |
| 7,106,717 B2 | 9/2006 | Rosseau |
| 7,136,838 B1 | 11/2006 | Peinado |
| 7,151,946 B2 | 12/2006 | Magennti |
| 7,177,623 B2 | 2/2007 | Baldwin |
| 7,203,752 B2 | 4/2007 | Rice |
| 7,209,969 B2 | 4/2007 | Lahti et al. |
| 7,218,940 B2 | 5/2007 | Niemenna |
| 7,221,959 B2 | 5/2007 | Lindquist |
| 7,301,494 B2 | 11/2007 | Waters |
| 7,372,839 B2 | 5/2008 | Relan |
| 7,739,402 B2 | 6/2010 | Roese |
| RE42,927 E | 11/2011 | Want |
| 2001/0011247 A1 | 8/2001 | O'Flaherty |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0102999 A1 | 8/2002 | Maggenti |
| 2002/0112047 A1 | 8/2002 | Kushwaha |
| 2002/0135504 A1 | 9/2002 | Singer |
| 2002/0173317 A1 | 11/2002 | Nykanen |
| 2002/0198632 A1 | 12/2002 | Breed |
| 2003/0009602 A1 | 1/2003 | Jacobs |
| 2003/0037163 A1 | 2/2003 | Kitada |
| 2003/0065788 A1 | 4/2003 | Salomaki |
| 2003/0078064 A1 | 4/2003 | Chan |
| 2003/0081557 A1 | 5/2003 | Mettala |
| 2003/0098892 A1* | 5/2003 | Hiipakka .................. 345/846 |
| 2003/0101329 A1 | 5/2003 | Lahti |
| 2003/0101341 A1 | 5/2003 | Kettler |
| 2003/0103484 A1 | 6/2003 | Oommen |
| 2003/0114157 A1 | 6/2003 | Spitz |
| 2003/0119528 A1 | 6/2003 | Pew |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0204640 A1 | 10/2003 | Sahinaja |
| 2003/0223381 A1 | 12/2003 | Schroderus |
| 2004/0002326 A1 | 1/2004 | Maher |
| 2004/0044623 A1 | 3/2004 | Wake |
| 2004/0046667 A1 | 3/2004 | Copley |
| 2004/0064550 A1 | 4/2004 | Sakata |
| 2004/0068724 A1 | 4/2004 | Gardner |
| 2004/0090121 A1 | 5/2004 | Simonds et al. |
| 2004/0204806 A1 | 10/2004 | Chen |
| 2004/0205151 A1 | 10/2004 | Sprigg |
| 2004/0229632 A1 | 11/2004 | Flynn |
| 2005/0003797 A1 | 1/2005 | Baldwin |

(56) References Cited

U.S. PATENT DOCUMENTS

| | | |
|---|---|---|
| 2005/0028034 A1 | 2/2005 | Gantman |
| 2005/0039178 A1 | 2/2005 | Marolia |
| 2005/0041578 A1 | 2/2005 | Huotari |
| 2005/0086340 A1 | 4/2005 | Kang |
| 2005/0086467 A1 | 4/2005 | Asokan |
| 2005/0112030 A1 | 5/2005 | Gauss |
| 2005/0136895 A1 | 6/2005 | Thenthiuperai |
| 2005/0172217 A1 | 8/2005 | Leung |
| 2005/0174987 A1 | 8/2005 | Raghav et al. |
| 2005/0209995 A1 | 9/2005 | Aksu |
| 2005/0246217 A1 | 11/2005 | Horn |
| 2005/0259675 A1 | 11/2005 | Tuohino |
| 2006/0053225 A1 | 3/2006 | Poikleska |
| 2006/0058045 A1 | 3/2006 | Nilsen |
| 2006/0074618 A1 | 4/2006 | Miller |
| 2006/0090136 A1 | 4/2006 | Miller |
| 2006/0097866 A1 | 5/2006 | Adamczyk |
| 2006/0212558 A1 | 9/2006 | Sahinoja |
| 2006/0212562 A1 | 9/2006 | Kushwaha |
| 2006/0234639 A1 | 10/2006 | Kushwaha |
| 2006/0234698 A1 | 10/2006 | Folk |
| 2006/0246920 A1 | 11/2006 | Shim |
| 2007/0026854 A1 | 2/2007 | Nath |
| 2007/0030116 A1 | 2/2007 | Feher |
| 2007/0030539 A1 | 2/2007 | Nath |
| 2007/0030973 A1 | 2/2007 | Mikan |
| 2007/0186105 A1 | 8/2007 | Bailey |
| 2007/0271596 A1 | 11/2007 | Boubion |
| 2008/0026723 A1* | 1/2008 | Han .............................. 455/410 |
| 2009/0204815 A1 | 8/2009 | Dennis |
| 2009/0328135 A1 | 12/2009 | Szabo |
| 2010/0024045 A1 | 1/2010 | Sastry |
| 2010/0050251 A1 | 2/2010 | Speyer |

OTHER PUBLICATIONS

Internal Search Report received in PCT/US2009/05575 dated Dec. 3, 2009.
International Search Report received in PCT/US2009/05575 dated Sep. 16, 2011.
International Search Report received in PCT/US2011/001198 dated Nov. 4, 2011.
International Search Report received in PCT/US2011/00671 dated Apr. 25, 2012.
International Search Report received in PCT/US2011/01198 dated Aug. 6, 2012.

* cited by examiner

FIG. 3
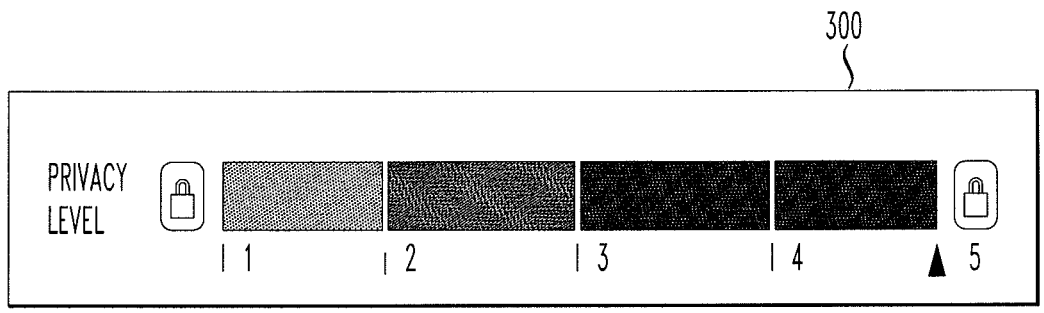
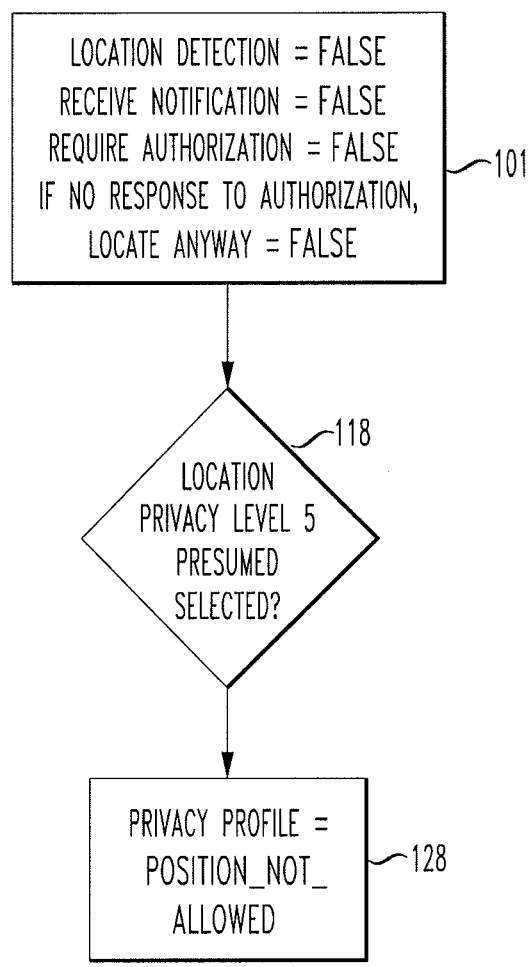

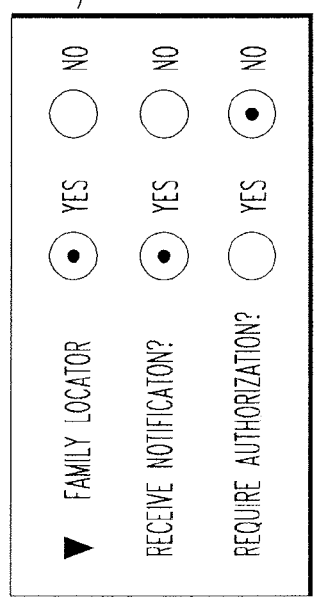
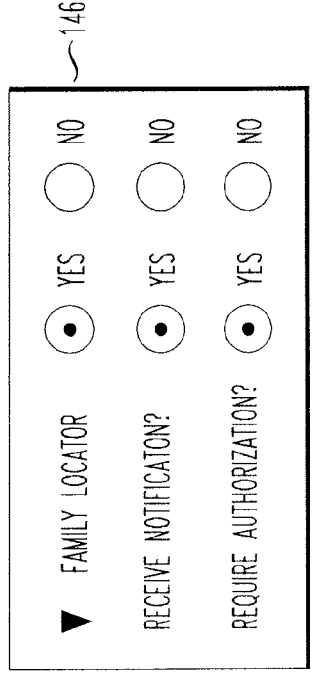
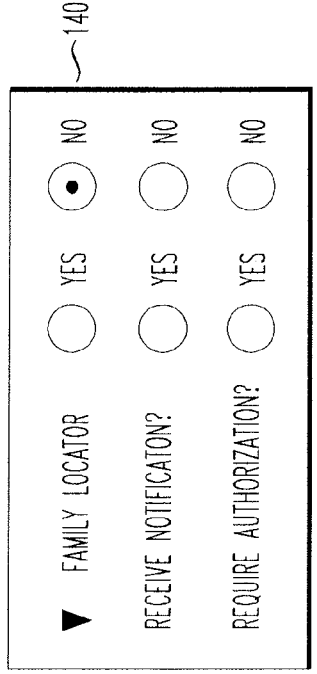
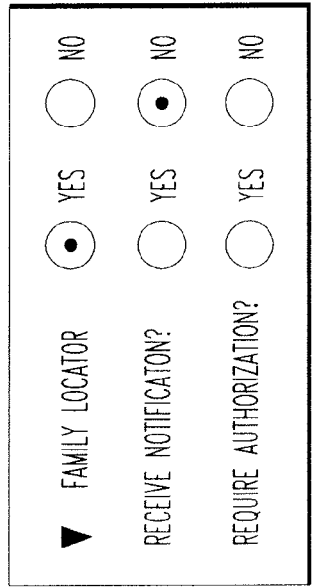
FIG. 11
(PRIOR ART)

LOCATION PRIVACY SELECTOR

This application is a continuation of U.S. application Ser. No. 13/067,942, entitled "Location Privacy Selector", filed on Jul. 8, 2011, now U.S. Pat. No. 8,315,599; which claims priority from U.S. Provisional Appl. No. 61/344,383, filed Jul. 9, 2010, entitled "Location Privacy Selector" to KASAD et al., the entirety of both of which are expressly incorporated herein by reference.

BACKGROUND OF THE INVENTION

1. Field of the Invention

This invention relates generally to telecommunications, Voice Over Internet Protocol (VoIP), cellular communications, and location based systems. More particularly, it relates to security and privacy levels in wireless, mobile and telecommunications.

2. Background of the Related Art

The incorporation of tracking technology in today's handheld mobile devices has led to a vast emergence of location based services. These tracking technologies generally include a precise, satellite-enabled Global Positioning System (GPS), as well as cell tower positioning and network access points, among others, capable of delivering approximate location of a wireless device. Such tracking devices were initially deployed in mobile communications as a result of a 2002 US Federal Communications Commission (FCC) mandate to incorporate such technology in mobile devices in the event users need to be located throughout use of emergency services, such as in Enhanced 911 (E911).

Location based services enable user-permitted software applications on internet-enabled wireless devices. These wireless devices often encompass a particular tracking technology, most often the Global Positioning System (GPS). Location technologies are also and/or alternatively network based, e.g., Position Determining Entities (PDE).

Location based applications obtain a particular device's geographical position, and then provide services accordingly. Example location based services include standard navigation and emergency applications, as well as those attributed with business and entertainment. For instance, use of location based pull services allow users to locate other individuals or objects of interest. Businesses may use push services to send promotional information upon user consent, e.g., based upon a user's proximity to a particular site of interest.

As location based services become increasingly prevalent and useful, location services also begin to raise concern for user privacy. In fact, as more applications begin to track and record individuals' whereabouts, some people wonder whether or not true privacy is possible anymore. After all, all recorded data concerning a user's location is owned by the network to which the user subscribes.

To mitigate consumer concern, certain privacy measures have been enacted by the industry. For instance, a Location Privacy Checking Protocol (PCP) defines location privacy settings using five distinct states of privacy.

FIGS. 9-12 show the conventional use of visual "radio-button" type controls to communicate the five (5) different privacy states included in the Privacy Checking Protocol (PCP).

FIG. 9 depicts exemplary POSITION_NOT_ALLOWED 130 and POSITION_WITHOUT_NOTIFY 132 privacy profiles defined by the Privacy Checking Protocol (PCP).

In particular, FIG. 9 portrays two basic Privacy Checking Protocol (PCP) privacy options that may be set by the user, usually in a settings' menu, to either allow or disallow a location server to disclose the location of that user's wireless device to any requesting application. These options form POSITION_NOT_ALLOWED 130 and POSITION_WITHOUT_NOTIFY 132 privacy profiles. The POSITION_NOT_ALLOWED 130 privacy profile disallows location based services to be notified of the whereabouts of a user's wireless device altogether. On the other hand, the POSITION_WITHOUT_NOTIFY 132 privacy profile allows any location based application to receive knowledge of the geographical position of a user's wireless device, and also indicates that the user does not wish to be notified about the release of this location information.

FIG. 10 depicts an exemplary NOTIFY_POSITION 138 privacy profile defined by the Privacy Checking Protocol (PCP).

In particular, FIG. 10 builds upon the two basic Privacy Checking Protocol (PCP) privacy settings by taking them one step further, introducing a "Receive Notification" option. Use of the "Receive Notification" option introduces a NOTIFY_POSITION 138 privacy profile that allows the location of a user's wireless device to be disclosed as long as the user is notified that this exchange of information is taking place.

FIG. 11 depicts an exemplary NOTIFY_POSITION_IF_GRANTED 146 privacy profile defined by the Privacy Checking Protocol (PCP).

In particular, FIG. 11 introduces a Privacy Checking Protocol (PCP) "Require Authorization" privacy option. If a user checks the "Yes" radio button indicating that they would appreciate this service, a user must provide authorization before a location server may divulge the whereabouts of a particular wireless device. This leads to a new privacy profile, NOTIFY_POSITION_IF_GRANTED 146.

FIG. 12 depicts an exemplary NOTIFY_POSITION_IF_NO_RESPONSE 154 privacy profile defined by the Privacy Checking Protocol (PCP).

In particular, FIG. 12 indicates the addition of a Privacy Checking Protocol (PCP) "If No Response, Locate Anyway" privacy option. If a user selects the "Yes" radio button pertaining to this setting, then location information is sent to the appropriate location server in the absence of a user response to user authentication. This setting leads to yet another privacy profile, NOTIFY_POSITION_IF_NO_RESPONSE 156. On the other hand, if the "No" radio button is selected in accordance with this privacy option, then location information may only be disclosed by the location server if it is authorized to do so by the user. Therefore, the geographical position of a user's wireless device will not be revealed if that user fails to respond to an authorization message.

SUMMARY OF THE INVENTION

A wireless device capable of being located over a network by a requesting party comprises a phone, and a display to display a visually-continuous location privacy slider having at least five stops. Each of the at least five stops corresponds to a given combination of settings within the phone relating to a privacy of reporting of location of the wireless device to a requesting device.

In accordance with another aspect of the invention, a method of implementing a desired level of location privacy on a wireless device with a visually-continuous location privacy slide set to any of a plurality of stops each gradually increasing in location privacy respectively from one end to the other, comprises establishing a first combination of privacy settings among a plurality of applications operable on a wireless device when a lowest level of privacy is selected by a slide stopped at a first stop position at one end of a visually-continuous location privacy slide. A second combination of privacy settings is established among the plurality of applications operable on the wireless device when a central level of privacy is selected by the slide stopped at a central stop position of the visually-continuous location privacy slide. A third combination of privacy settings is established among the plurality of applications operable on the wireless device when a highest level of privacy is selected by a slide stopped at a last stop position at a second end of the visually-continuous location privacy slide.

BRIEF DESCRIPTION OF THE DRAWINGS

Features and advantages of the present invention will become apparent to those skilled in the art from the following description with reference to the drawings, in which:

FIG. 3 denotes an exemplary POSITION_NOT_ALLOWED 128 privacy profile, e.g., at Level 5 on the visually-continuous location privacy slider 300, in accordance with the principles of the present invention.

FIG. 11 depicts an exemplary NOTIFY_POSITION_IF_GRANTED 146 privacy profile defined by the Privacy Checking Protocol (PCP).

DETAILED DESCRIPTION OF ILLUSTRATIVE EMBODIMENTS

The present invention provides a method of simplifying the user modification of privacy settings to a more exact and more easily achieved proper level of location disclosure a user is willing to reveal to requesting location based services. The method comprises a user friendly visually-continuous location privacy slider 300 that permits a user to choose one of multiple pre-determined settings, combinations, e.g., each setting corresponding to one level of the five (5) Privacy Checking Protocol (PCP) privacy settings that best fits their current needs. The visually-continuous location privacy slider 300 is preferably set up in order of ascending privacy levels. Users may simply graphically slide a visual pointer to the left to decrease their current level of privacy, or slide the visual pointer to the right to increase their level of privacy.

Figure 1:
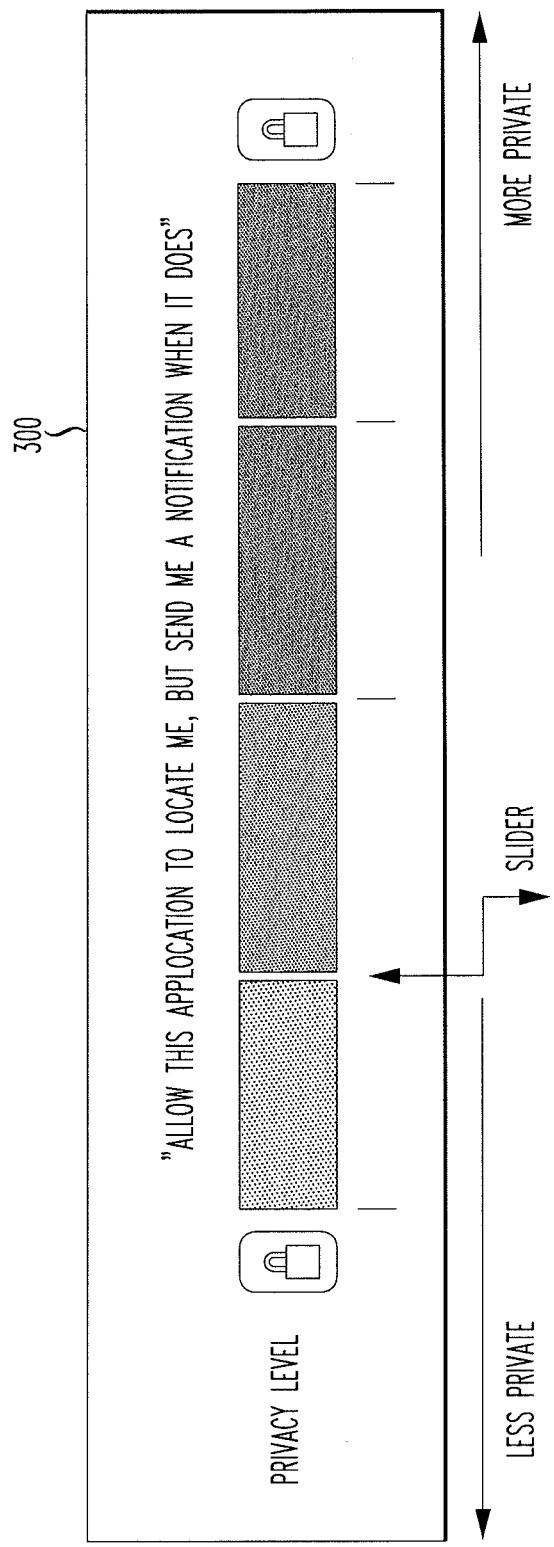
FIG. 1 depicts an exemplary visually-continuous location privacy slider 300 with multiple distinct privacy stops, each gradually being more private in a position to the right and gradually being less private in a position to the left, in accordance with the principles of the present invention.

FIG. 1 depicts an exemplary visually-continuous location privacy slider 300 with multiple distinct privacy stops, each gradually being more private in a position to the right and gradually being less private in a position to the left, in accordance with the principles of the present invention.

The present inventors have appreciated that creating a separate visual representation for each state of privacy may be highly confusing and not as user friendly as possible. Moreover, many location-related applications may each have individual settings relating to privacy, leading to a logistical nightmare for a user as the number of such applications grows on a given wireless device. The inventors have appreciated that radio button-type control of privacy settings can make it very difficult for an end user to set their privacy permissions to a level which they desire. Furthermore, conventional button-type or on/off type visual representation often consumes too much display real estate on a user interface. Also, it has been discovered that display of too much privacy-related information on a handheld personal data assistant, smart phone, or the like is difficult to achieve due to the typically limited screen size.

The present invention provides a visually-continuous location privacy slider 300 that has many slide stops. The embodiments disclosed herein provide a visually-continuous location privacy slider 300 with, e.g., five (5) stops respectively corresponding to each of the five (5) defined levels in the Privacy Checking Protocol (PCP), but the principles of the invention are equally applicable to a visually-continuous location privacy slider 300 with many more than five (5) stops.

The multiple-stop singular visually-continuous location privacy slider 300 is a user interface element on a wireless device such as a smart phone or the like that permits a user to quickly and easily set their desired privacy relating to multiple different applications—and even without the need to fully understand the often complex logic associated with individual privacy settings often times separately adjusted in each of many location-based applications on their wireless device. The visually-continuous location privacy slider 300 preferably implements multiple setting standards, e.g., at a minimum the five (5) pre-defined privacy profiles defined by the Privacy Checking Protocol (PCP).

FIG. 1 shows a visually-continuous location privacy slider 300 with five (5) distinct stops to control different states of location privacy on a given wireless device. The visually-continuous location privacy slider 300 permits location settings to be configured easily, and in a timely fashion, without the need for a device user to read through various settings menus and select various different options relating to various aspects of their privacy, e.g., relating to their location, in each of a plurality of applications. The simplicity of the inventive visually-continuous location privacy slider 300 simplifies establishment of location based privacy settings in everyday mobile device usage. A wireless device may have its location privacy attributes quickly and simply altered as the situation changes, as need be.

Figure 2:
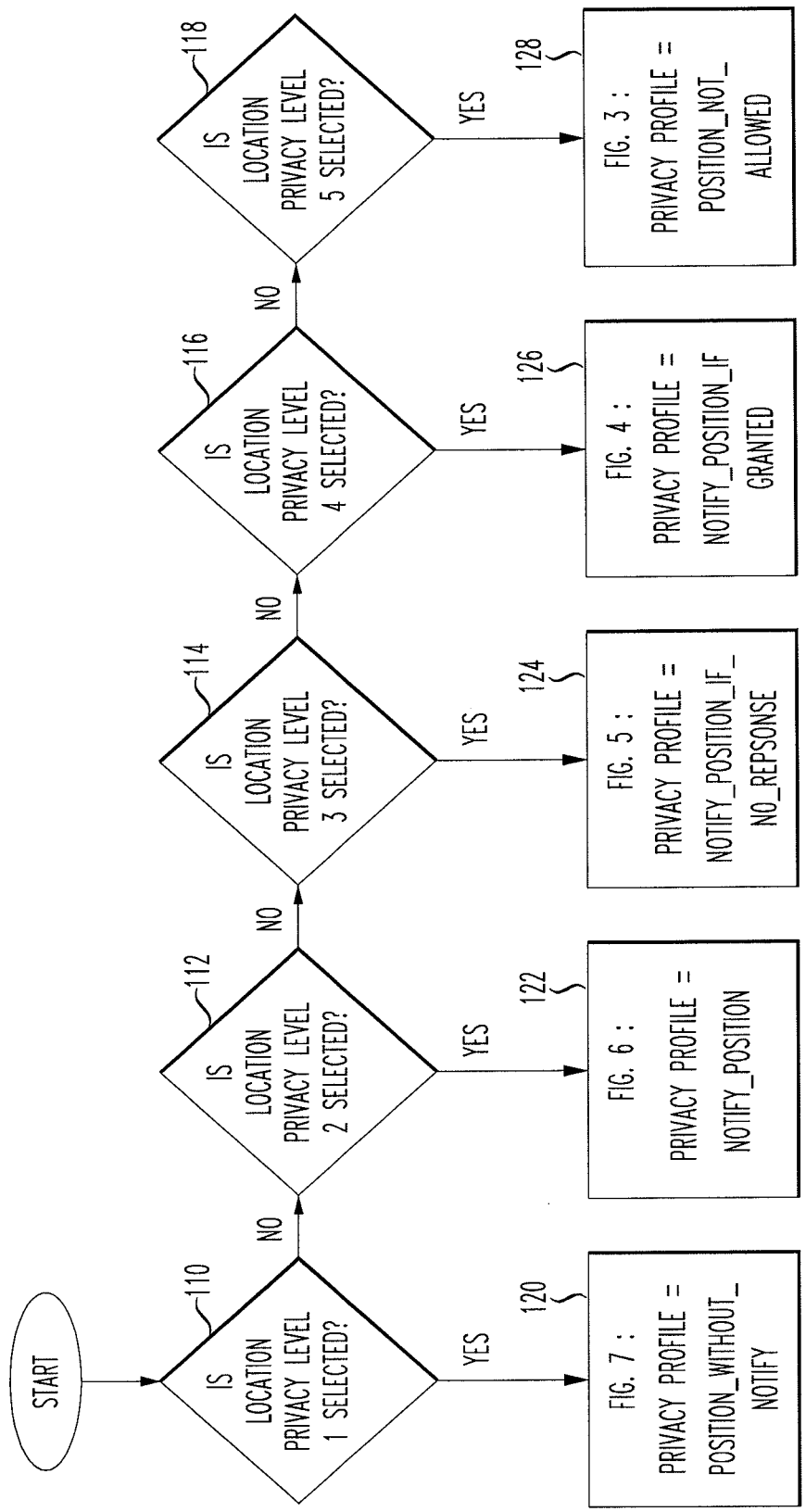
FIG. 2 denotes an exemplary five (5) location privacy stops as depicted in FIG. 1.

FIG. 2 denotes the exemplary five (5) location privacy stops, 1-5, as depicted in FIG. 1.

Figure 7:
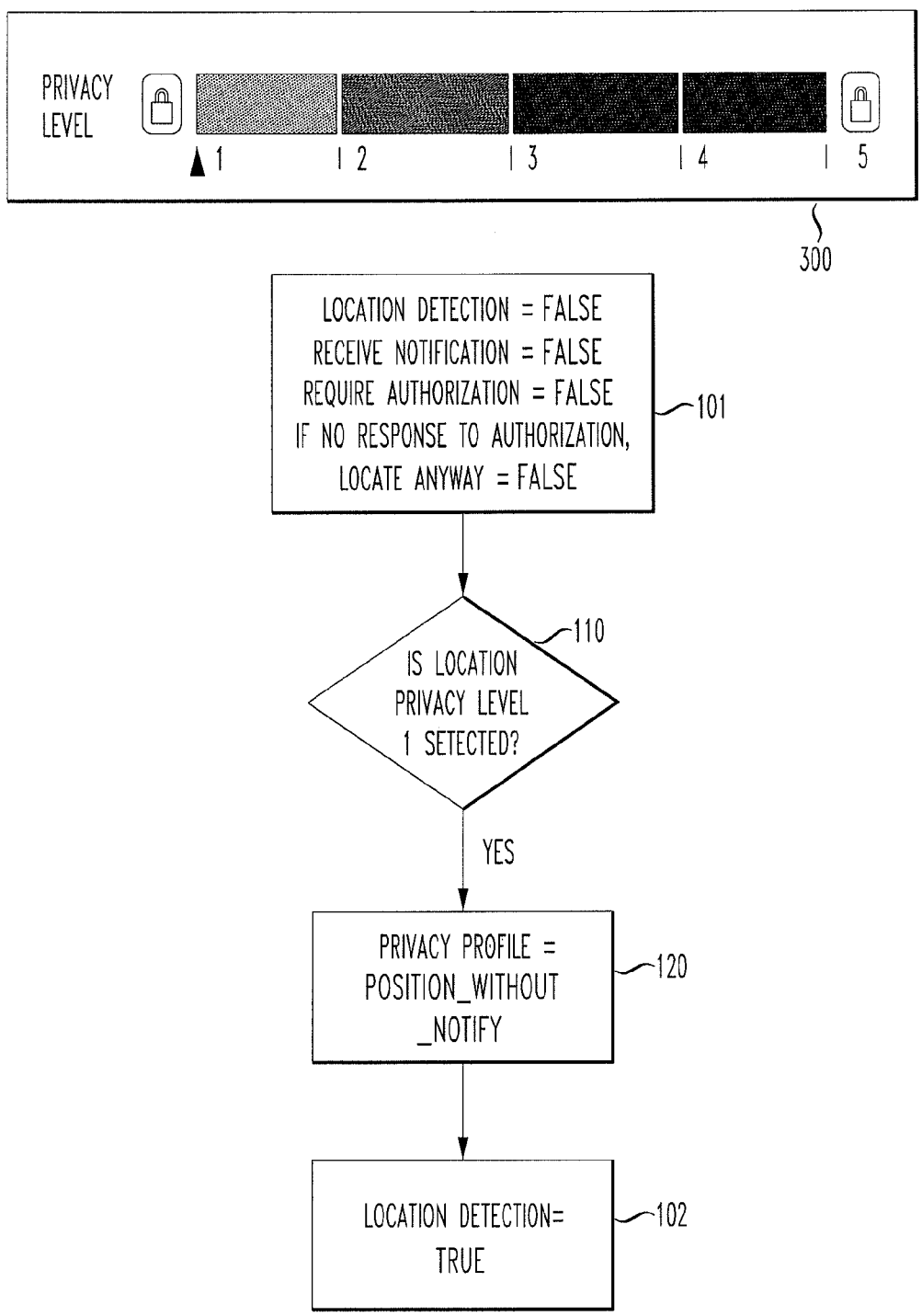
FIG. 7 denotes an exemplary POSITION_WITHOUT_NOTIFY 120 privacy profile, e.g., at Level 1 on the visually-continuous location privacy slider 300, in accordance with the principles of the present invention.

In particular, the decision tree in FIG. 2 shows that if the slider is positioned at stop 1 corresponding to Level 1 on the visually-continuous location privacy slider 300, a POSITION_WITHOUT_NOTIFY 120 privacy profile is chosen, which is further depicted in FIG. 7.

Figure 6:
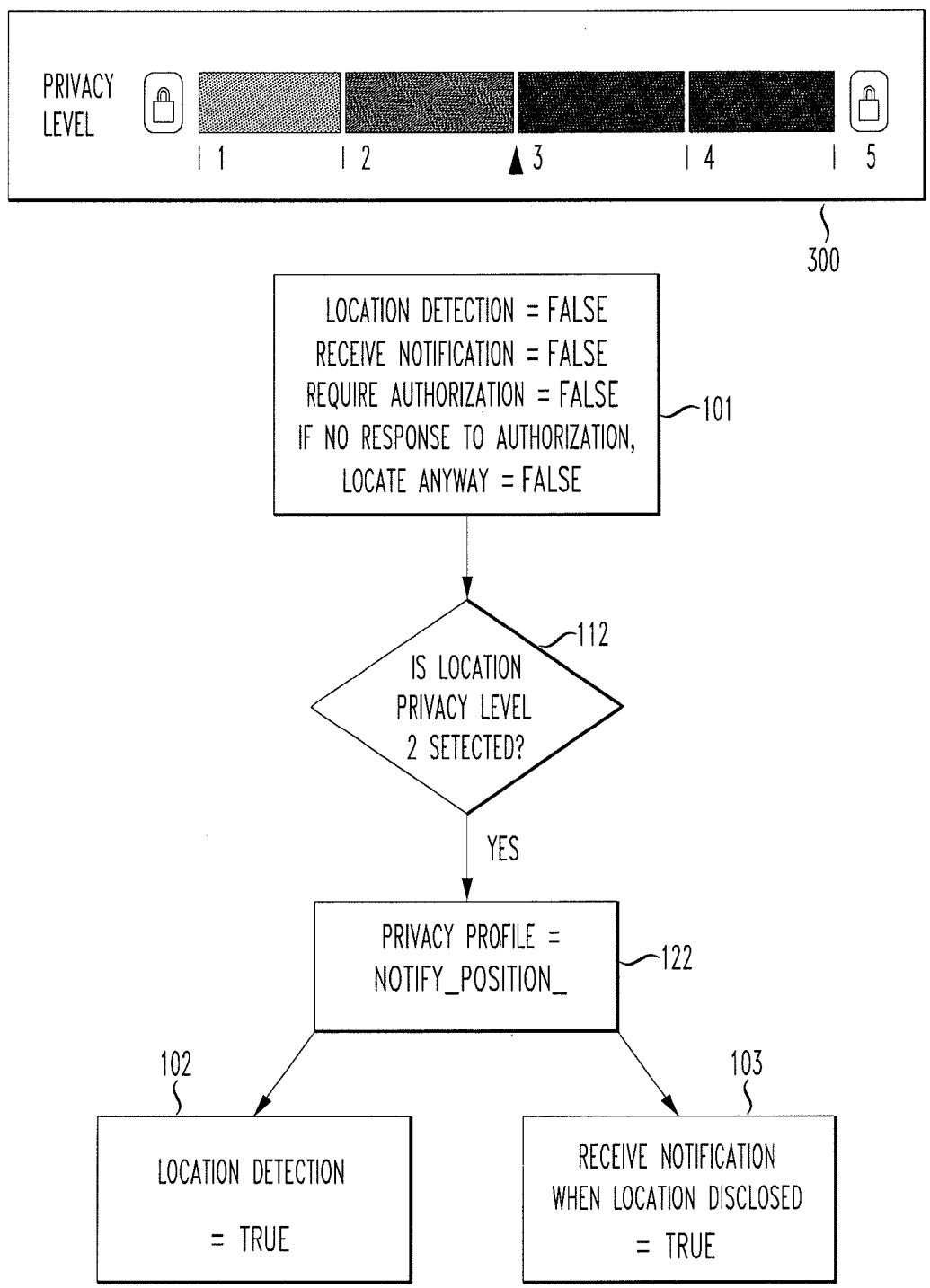
FIG. 6 denotes an exemplary NOTIFY_POSITION 122 privacy profile, e.g., at Level 2 on the visually-continuous location privacy slider 300, in accordance with the principles of the present invention.

If the slider of the visually-continuous location privacy slider 300 is set to the second stop, Level 2 corresponding to a NOTIFY_POSITION 122 privacy profile is chosen, which is further depicted in FIG. 6.

Figure 5:
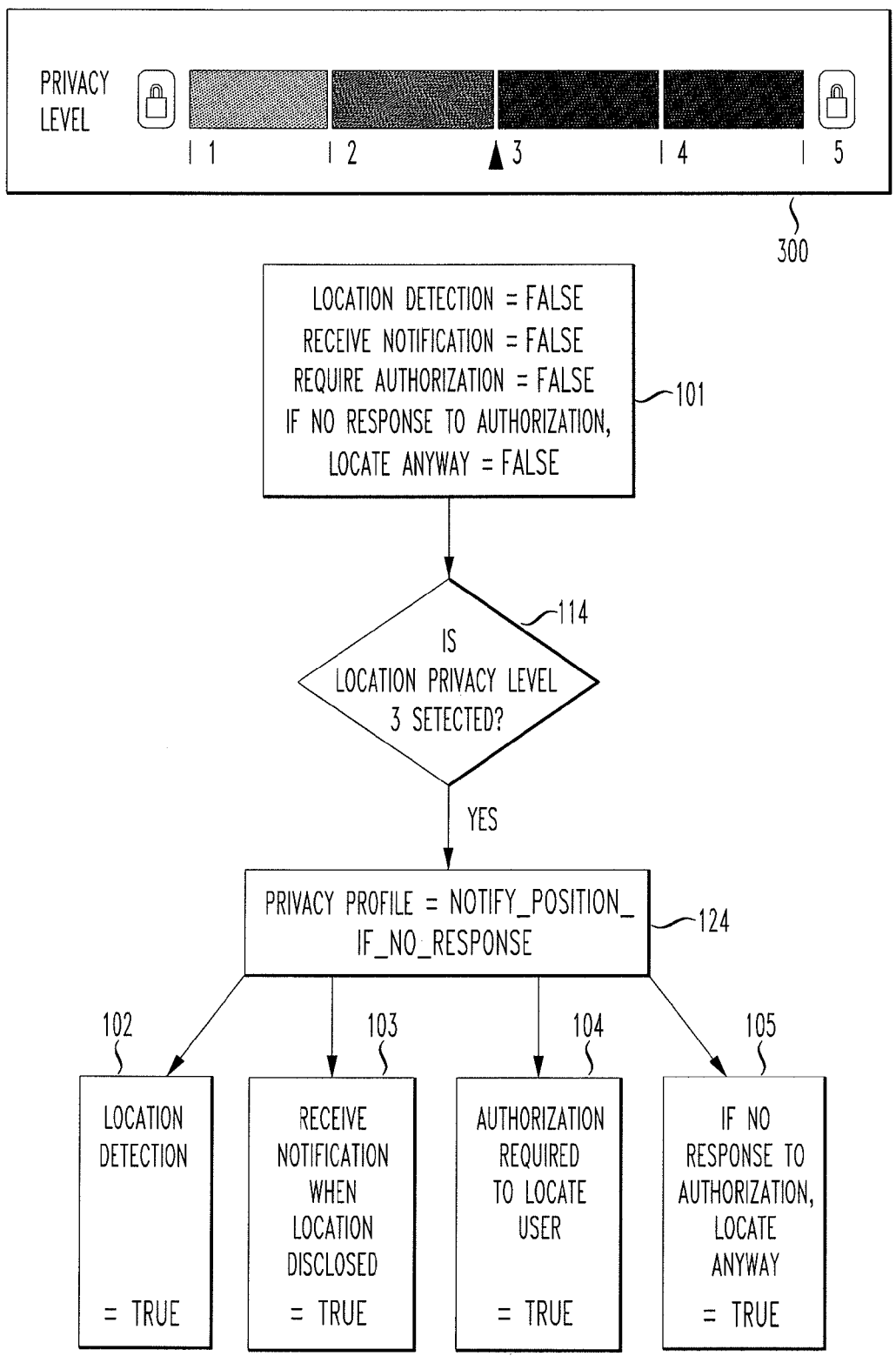
FIG. 5 denotes an exemplary NOTIFY_POSITION_IF_NO_RESPONSE 124 privacy profile, e.g., at Level 3 on the visually-continuous location privacy slider 300, in accordance with the principles of the present invention.

If the slider of the visually-continuous location privacy slider 300 is set to the third stop, Level 3 corresponding to a NOTIFY_POSITION_IF_NO_RESPONSE 124 privacy profile is implemented, which is further depicted in FIG. 5.

Figure 4:
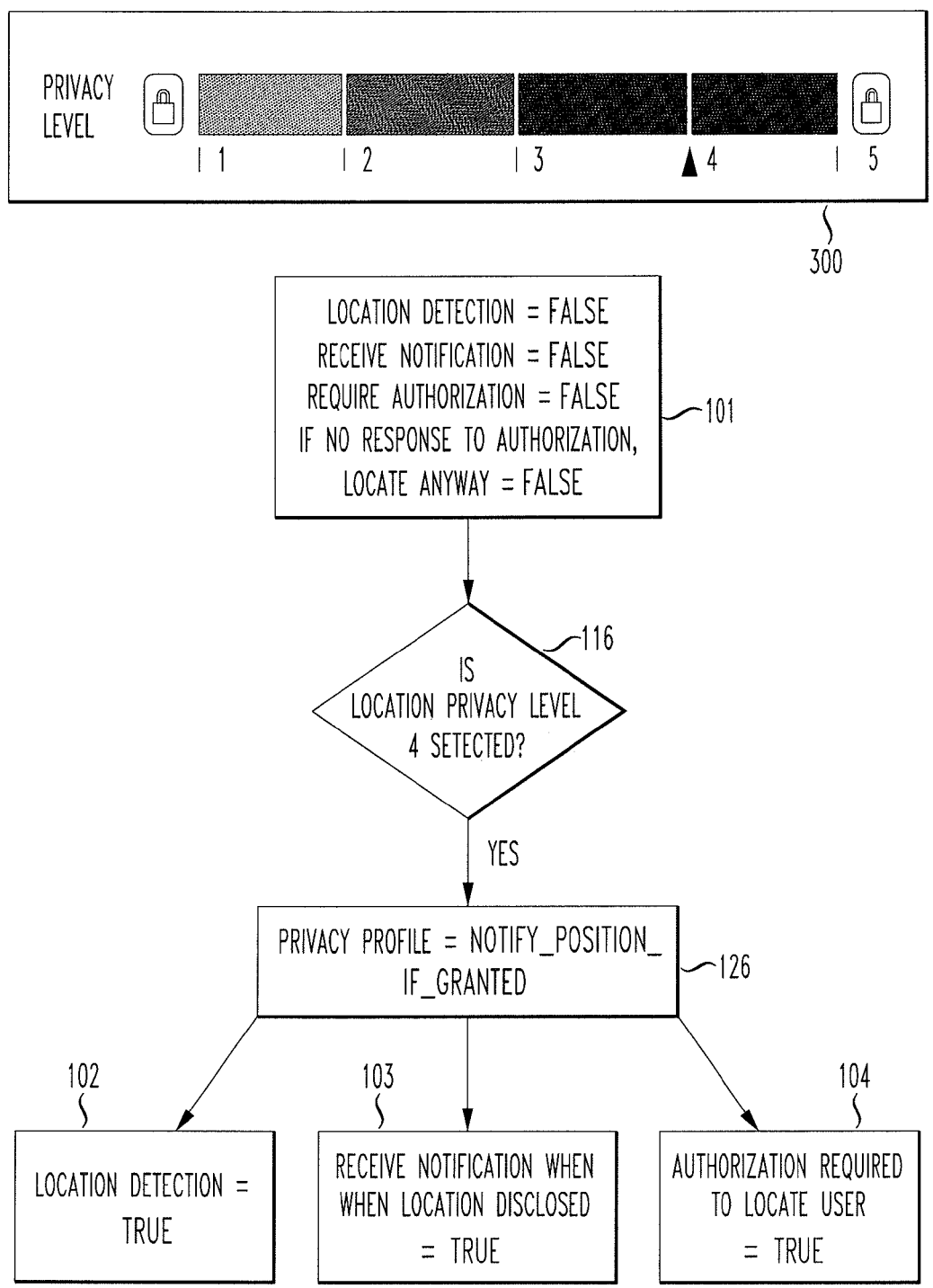
FIG. 4 denotes an exemplary NOTIFY_POSITION_IF_GRANTED 126 privacy profile, e.g., at Level 4 on the visually-continuous location privacy slider 300, in accordance with the principles of the present invention.

If the slider of the visually-continuous location privacy slider 300 is set to the fourth stop, Level 4 corresponding to a NOTIFY_POSITION_IF_GRANTED 126 privacy profile is implemented, which is further depicted in FIG. 4.

If the slider of the visually-continuous location privacy slider 300 is set to the fifth stop, Level 5 corresponding to a POSITION_NOT_ALLOWED 128 privacy profile is implemented, which is further depicted in FIG. 3.

FIG. 3 denotes the most-private selection, an exemplary POSITION_NOT_ALLOWED 128 privacy profile, e.g., at Level 5 on the visually-continuous location privacy slider 300, in accordance with the principles of the present invention.

In particular, the POSITION_NOT_ALLOWED 128 privacy setting, the fifth stop on the far right-hand side of the visually-continuous location privacy slider 300 shown in FIG. 3, turns off location detection 101 on the user's handheld device and consequently causes denial of all requests for information regarding the location of that user's wireless device.

FIG. 4 denotes the next-to-greatest private selection, an exemplary NOTIFY_POSITION_IF_GRANTED 126 privacy profile, e.g., at Level 4 on the visually-continuous location privacy slider 300, in accordance with the principles of the present invention.

In particular, the NOTIFY_POSITION_IF_GRANTED 126 privacy stop, e.g., a fourth stop on the visually-continuous location privacy slider 300 shown in FIG. 4, (though numbering need not be visually indicated to the user) permits location detection 102 and requires that a request for authorization 104 be sent to the user, and a "Yes" response be received in return, for wireless device location to be disclosed. In this case, a user receives notification 103 of the disclosure of that user's wireless device location. The NOTIFY_POSITION_IF_GRANTED 126 privacy setting does not make use of the "If No Response, Locate Anyway" privacy option. Thus, if no authorization response is received from the user, location of a user's wireless device may not be revealed.

FIG. 5 denotes an exemplary NOTIFY_POSITION_IF_NO_RESPONSE 124 privacy profile, e.g., at Level 3 on the visually-continuous location privacy slider 300, in accordance with the principles of the present invention.

In particular, the NOTIFY_POSITION_IF_NO_RESPONSE 124 privacy setting, the third stop on the visually-continuous location privacy slider 300 shown in FIG. 5 sends an authorization request 104 to the user when a location-based application requests knowledge of the current location of that user's wireless device. If the user fails to respond to the authorization request, the appropriate location server provides the location of that user's wireless device to any requesting applications.

FIG. 6 denotes the next-to-least private selection, an exemplary NOTIFY_POSITION 122 privacy profile, e.g., at Level 2 on the visually-continuous location privacy slider 300, in accordance with the principles of the present invention.

In particular, the NOTIFY_POSITION 122 privacy setting, the second stop on the visually-continuous location privacy slider 300 shown in FIG. 6, permits location detection 102 and sends a user notification 103 indicating information that the geographical location of that user's wireless device is being revealed, and the wireless device is immediately located.

The NOTIFY_POSITION 122 privacy profile does not make use of the "Require Authorization" privacy option indicating that location based services do not need to receive authorization from a user before receiving information about a wireless device's geographical position.

FIG. 7 denotes the least-private selection, an exemplary POSITION_WITHOUT_NOTIFY 120 privacy profile, e.g., at Level 1 on the visually-continuous location privacy slider 300, in accordance with the principles of the present invention.

In particular, the POSITION_WITHOUT_NOTIFY 120 privacy stop, numbered 1 on the far left-hand side of the visually-continuous location privacy slider 300 shown in FIG. 7, permits location detection 102 and allows location of a user's wireless device to be released without requiring notification and/or authorization of the event.

Figure 8:
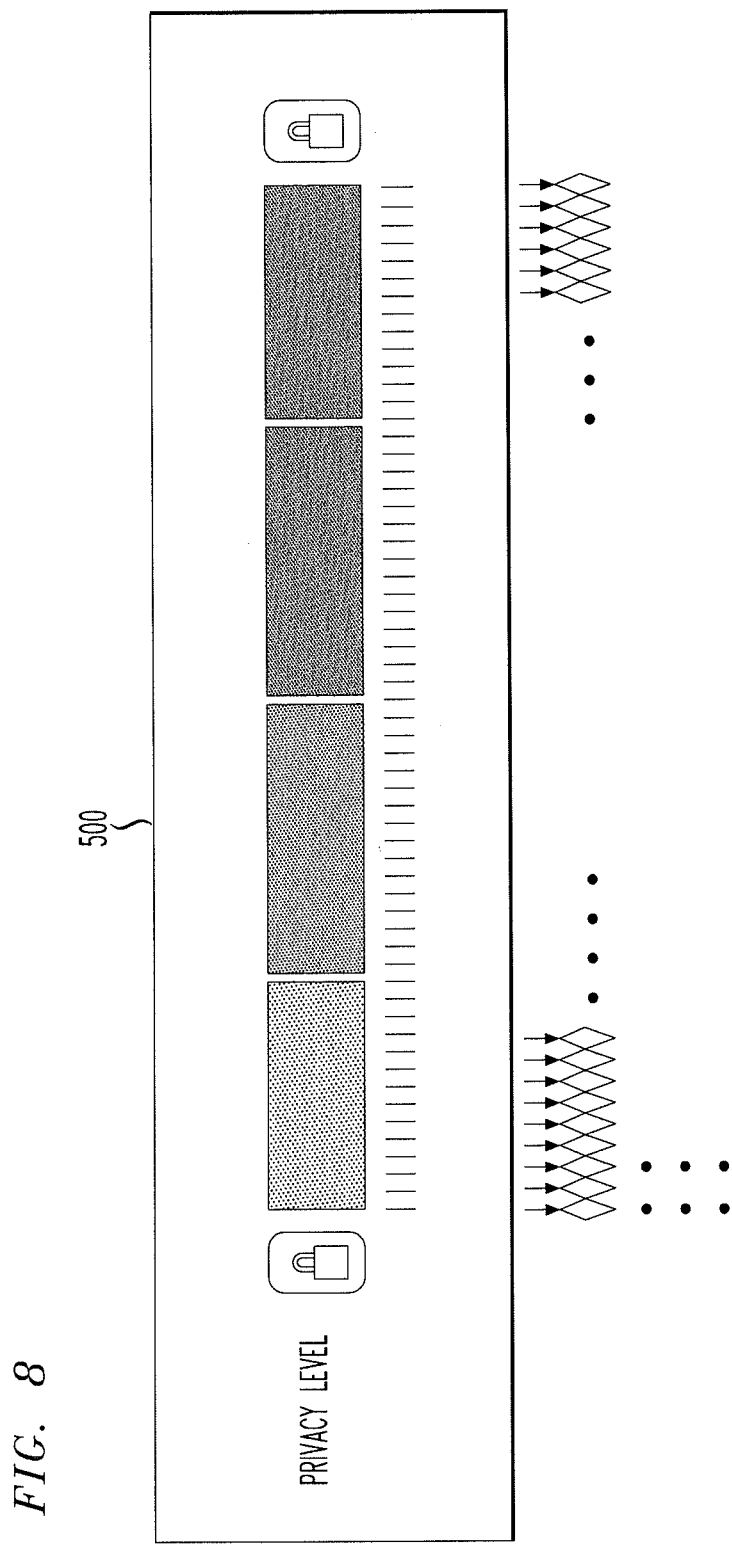
FIG. 8 depicts an exemplary visually-continuous location privacy slider 500 having many, many distinct number of stop positions, in accordance with the principles of the present invention.
Figure 9:
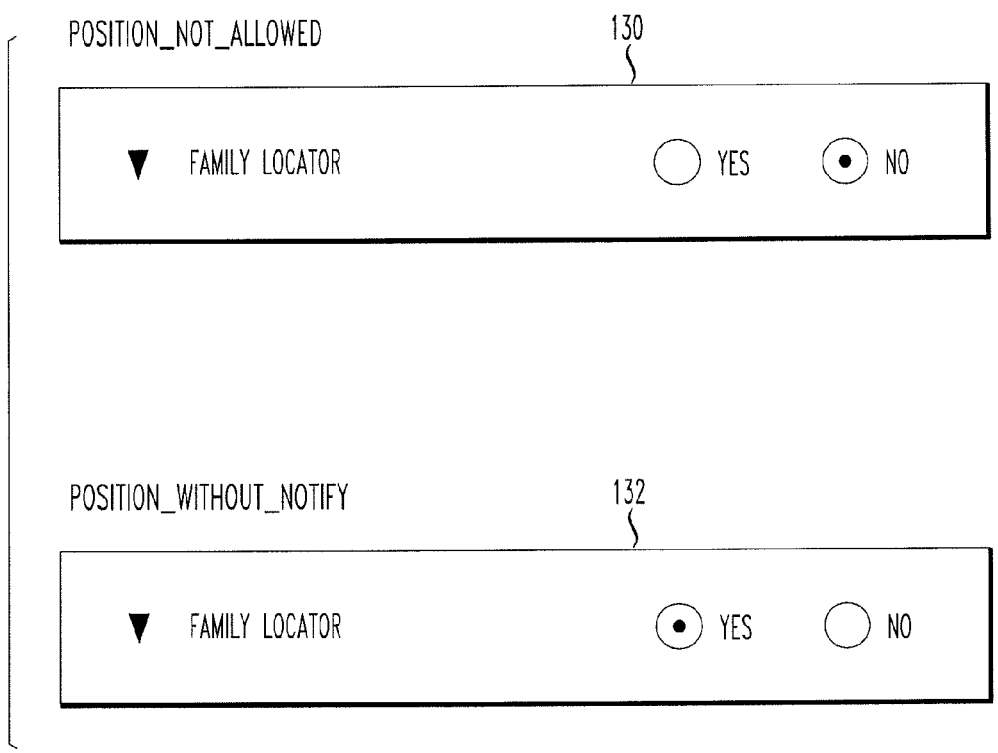
FIG. 9 depicts exemplary POSITION_NOT_ALLOWED 130 and POSITION_WITHOUT_NOTIFY 132 privacy profiles defined by the Privacy Checking Protocol (PCP).
Figure 10:
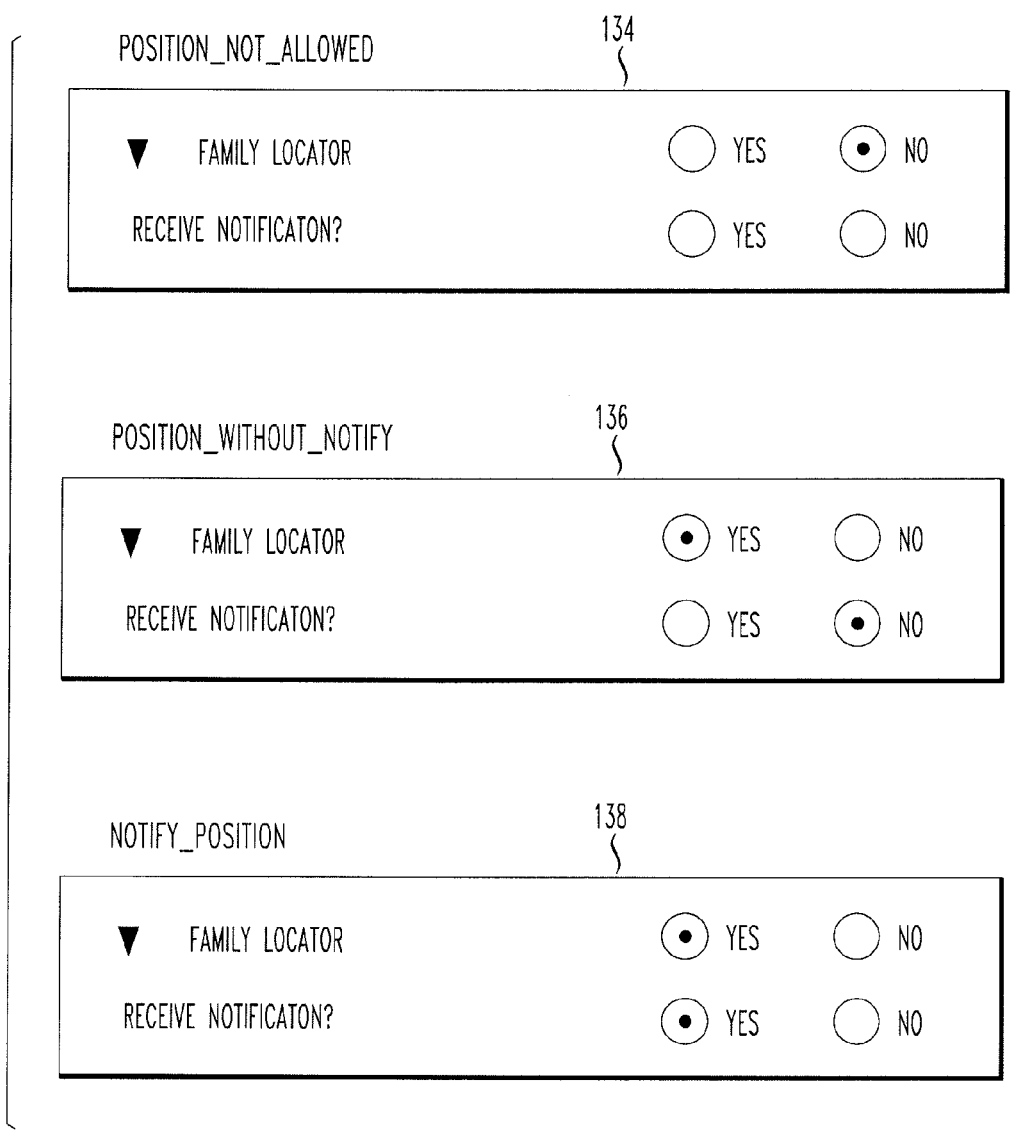
FIG. 10 depicts an exemplary NOTIFY_POSITION 138 privacy profile defined by the Privacy Checking Protocol (PCP).
Figure 12:
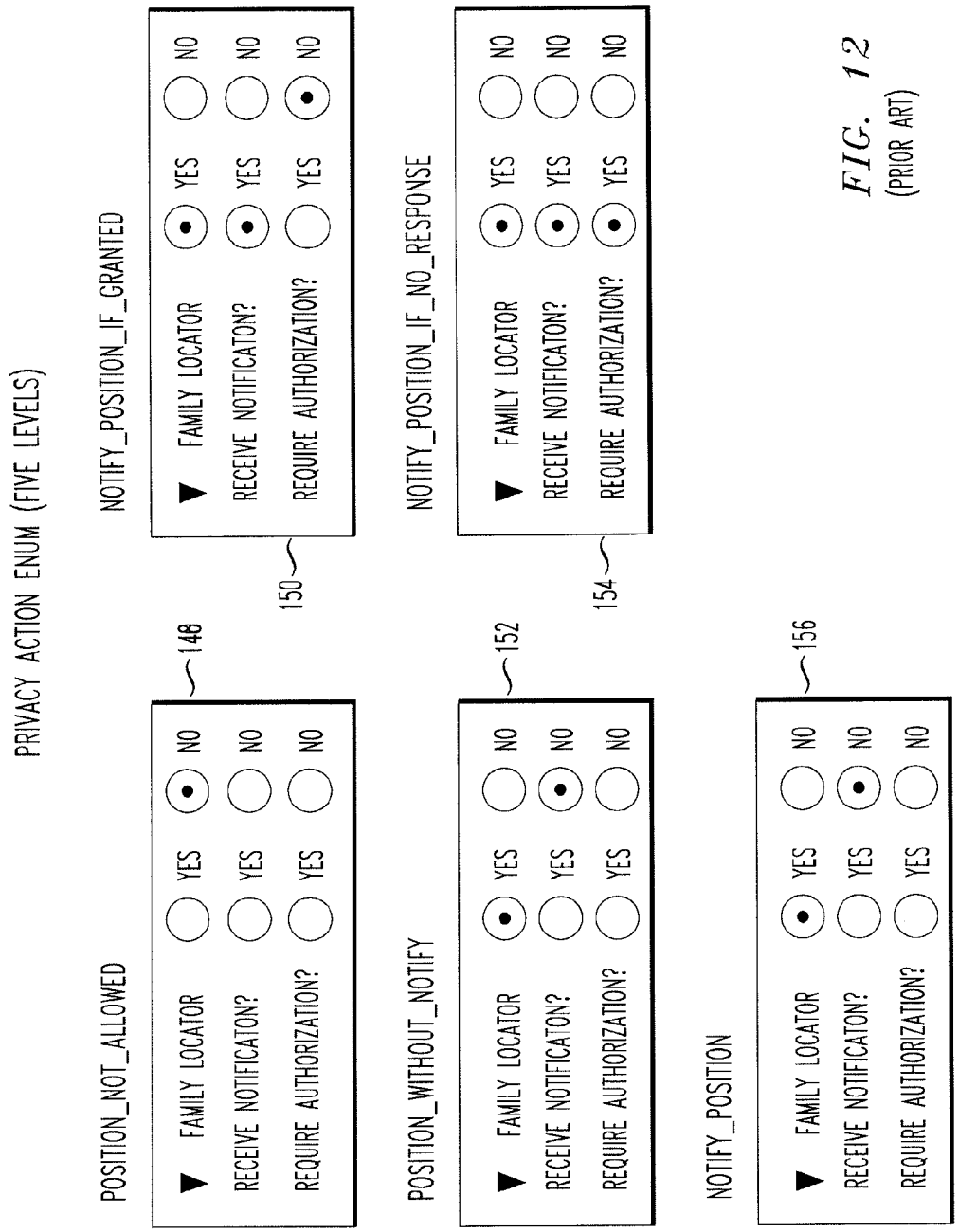
FIG. 12 depicts an exemplary NOTIFY_POSITION_IF_NO_RESPONSE 154 privacy profile defined by the Privacy Checking Protocol (PCP).

FIG. 8 depicts an exemplary visually-continuous location privacy slider 500 having many, many distinct number of stop positions, in accordance with the principles of the present invention.

In particular, as shown in FIG. 8, the present invention entails a visually-continuous location privacy slider 500 that encompasses many, many multiple distinct levels of privacy, as otherwise shown and described with reference to FIGS. 1-7. The visually-continuous location privacy slider 500 may be used to implement many, many multiple distinct stops such that it appears to the user that the visually-continuous location privacy slider 500 appears to have a virtually infinite number of gradually increasing levels and degrees of privacy. The level and degree of privacy established on the wireless device depends upon the position of the pointer on the visually-continuous location privacy slider 500.

Each position of privacy on a visually-continuous location privacy slider 500 that encompasses multiple distinct levels of privacy are associated with a particular numerical position value, e.g., 1 through n. The position of the pointer of the visually-continuous location privacy slider 500 determines the level of privacy to be set. Certain privacy settings are predetermined for particular numerical values, the higher the numerical position on the visually-continuous location privacy slider 500, the higher the privacy established on the wireless device. The numerical position is matched against pre-determined privacy settings to implement the desired privacy profile used.

For instance, if a user has chosen a maximum Location Privacy Level, e.g., Location Privacy Level n, then all privacy settings are set equal to true. On the contrary, if a user opts for the lowest possible Location Privacy Level, e.g., Location Privacy Level 1, all location privacy settings remain false. For levels of privacy between these two maximum and minimum outliers, a user's location privacy settings may depend upon the particular value, or range of values, of the numerical pointer on the visually-continuous location privacy slider 500.

The privacy settings may preferably be established upon exit from a menu display showing said visually-continuous location privacy slide, though it is also within the principles of the present invention to implement the selected pre-determined combination of privacy settings whenever a finger leaves a touch screen on the display after having set the slide.

The invention has particular applicability to location privacy in telecommunication and media markets.

While the invention has been described with reference to the exemplary embodiments thereof, those skilled in the art will be able to make various modifications to the described embodiments of the invention without departing from the true spirit and scope of the invention.

What is claimed is:

1. A wireless device locatable over a communication network, comprising:
   a display to display a visual location privacy selector having at least five stops;
   wherein each of said at least five stops corresponds to a given location privacy setting for a wireless device associated with a privacy reporting of location information, said location privacy setting including location information not allowed, location information given without notification, notify when location information given, notification of location information when location information request authorized, and location information given if no response to authorization request.

2. A wireless device locatable over a communication network according to claim 1, wherein:
   said location privacy selector is a visually-continuous location privacy selector.

3. A wireless device locatable over a communication network according to claim 1, further comprising:
   a phone.

4. A wireless device locatable over a communication network according to claim 1, wherein:
   said location information is requested by a requesting party device.

5. A wireless device locatable over a communication network according to claim 1, wherein:
   said at least five stops correspond to a given combination of settings for individual location functions defined by a Location Privacy Checking Protocol (PCP) standard.

6. A wireless device locatable over a communication network according to claim 1, wherein:
   said communication network is a wireless network.

7. A method of implementing a desired level of location privacy on a wireless device, comprising:
   establishing a first location privacy setting for an application operable on a wireless device when a visual location privacy selector is set on a first stop of said visual location privacy selector corresponding to location information not allowed to a requesting device;
   establishing intermediary location privacy settings for said application when said visual location privacy selector is set on any of a plurality of central stops of said visual location privacy selector corresponding respectively to: location information given to said requesting device without notification, notify when location information given to said requesting device, and notification of location information given when location request by said requesting device is authorized; and
   establishing a highest location privacy setting for said application when said visual location privacy selector is set at a last stop on said visual location privacy selector corresponding to location information is given when no response to authorization request is received.

8. A method of implementing a desired level of location privacy on a wireless device according to claim 7, wherein:
   said visual location privacy selector is a visually-continuous, linear location privacy selector.

9. A method of implementing a desired level of location privacy on a wireless device according to claim 7, wherein:
   said wireless device includes a phone.

10. A method of implementing a desired level of location privacy on a wireless device according to claim 7, wherein:
    said location information is requested by a requesting party device.

11. A method of implementing a desired level of location privacy on a wireless device according to claim 7, wherein:
    said location information is requested by a network location-based services server.

12. A method of implementing a desired level of location privacy on a wireless device according to claim 7, wherein:
    said first stop, said plurality of central stops, and said last stop correspond to a given combination of settings for individual location functions defined by a Location Privacy Checking Protocol (PCP) standard.

13. A method of implementing a desired level of location privacy on a wireless device according to claim 7, wherein:
    said location information of said wireless device is requested via a wireless network.

* * * * *